Figure 1:
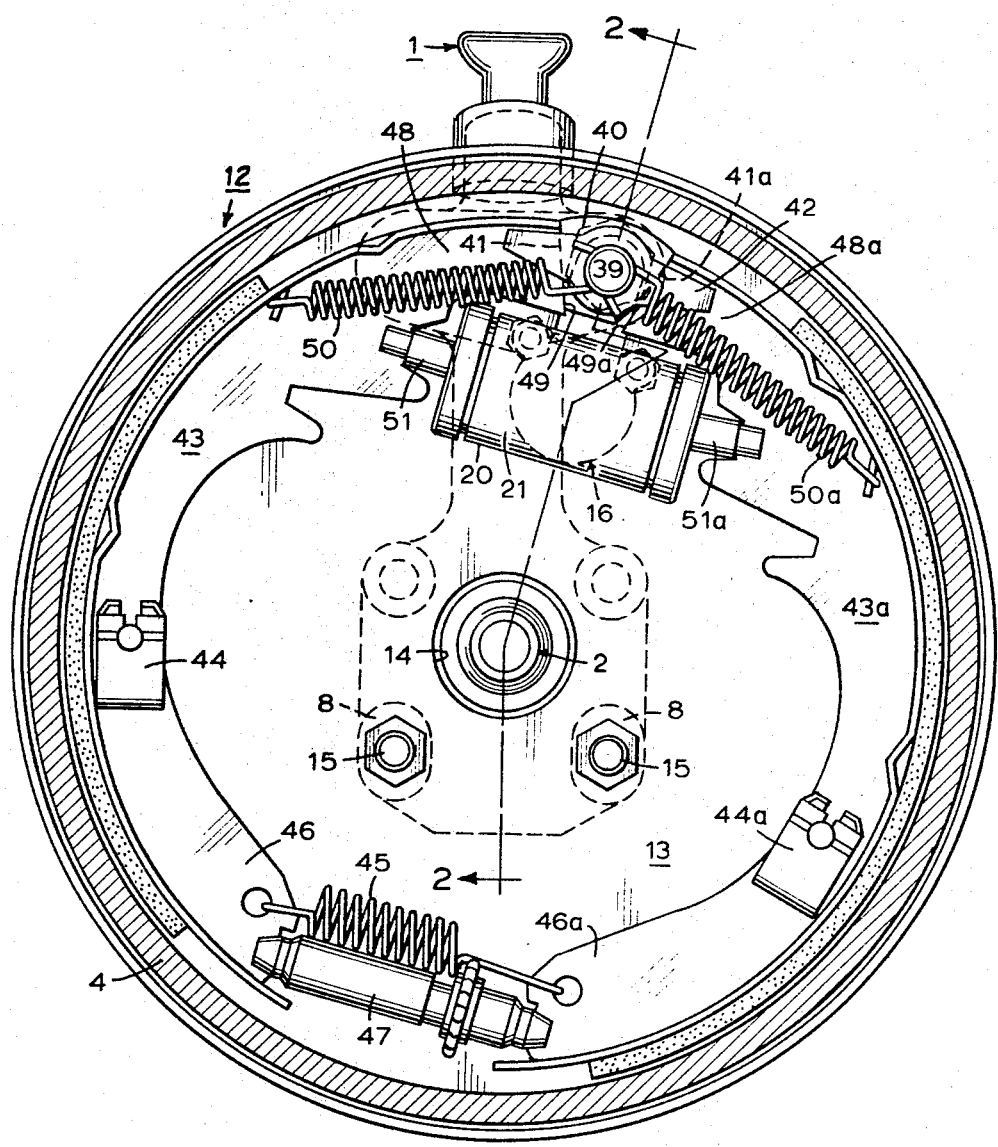

Oct. 18, 1966          J. E. PAPIN              3,279,568
                       BRAKE SUPPORT
Filed Aug. 28, 1964                        3 Sheets-Sheet 1

INVENTOR
Joseph E. Papin

Oct. 18, 1966  J. E. PAPIN  3,279,568
BRAKE SUPPORT

Filed Aug. 28, 1964  3 Sheets-Sheet 3

INVENTOR
Joseph E. Papin.

United States Patent Office 3,279,568
Patented Oct. 18, 1966

3,279,568
BRAKE SUPPORT
Joseph E. Papin, Berkeley, Mo., assignor to Wagner Electric Corporation, St. Louis, Mo., a corporation of Delaware
Filed Aug. 28, 1964, Ser. No. 392,710
24 Claims. (Cl. 188—206)

This invention relates in general to friction devices and in particular to friction devices utilizing vehicle steering knuckle and spindle supports for mounting purposes.

In the past, friction devices, which were known in the art as knuckle mounted brakes, were mounted on a vehicle by fixedly connecting the backing plate and anchor pin thereof with the vehicle steering knuckle and spindle support, respectively. One of the main disadvantages or undesirable features of such knuckle mounted brakes was the inability to effectively maintain the concentricity of the brake shoes with respect to the brake drum. This concentricity problem was mainly effected by two critical dimensions in the knuckle mounted brake design which necessarily had to be maintained within extremely close tolerance limits which, of course, adversely affected the machining costs involved. One of these critical dimensions was the radial distance between the centerline of the vehicle spindle and the centerline of the brake anchor pin, and the other of the critical dimensions was the axial distance between the brake mounting pads or seating surfaces, respectively, provided on the vehicle steering knuckle and spindle support. When the radial dimension was without the tolerance limits, the brake shoes were, of course, not concentrically positioned with respect to the drum. When the axial dimension was without the tolerance limits, the backing plate was distorted upon assembly between the knuckle and spindle mounting pads, and since the brake shoes were supported on the backing plate, such distortion moved said brake shoes to a position not concentric with the drum. Another disadvantageous or undesirable feature of past knuckle mounted brakes was that encountered in the service replacement of the wheel cylinder therein. The past wheel cylinders for knuckle mounted brakes included a positioning flange which was carried on the anchor pin and connected in abutting engagement between said anchor pin and the backing plate to position the wheel cylinder against displacement from the brake, and it was necessary to disconnect the anchor pin from its mounting position in fixed engagement with the vehicle steering knuckle in order to replace or service a malfunctioning wheel cylinder. Still another disadvantageous or undesirable feature of past knuckle mounted brakes was that it was necessary to threadedly engage a retaining nut or the like with the mounting end of the anchor pin which protruded through the backing plate into locking engagement with said backing plate to prevent the brake from coming apart or disassembling itself due to vibration, shocks or the like during handling, pallatizing and shipping. Further, it was necessary for the retaining nut to be disengaged from the anchor pin before the brake could be installed on a new vehicle on the assembly line of a vehicle manufacture which, of course, added to the assembly cost.

The main object of the present invention is to provide an improved knuckle mounted brake which overcomes the aforementioned disadvantageous or undesirable features.

Another object of the present invention is to provide a knuckle mounted brake assembly having a backing plate which is axially "floatable" with respect to the anchor pin.

Another object of the present invention is to provide a knuckle mounted brake assembly having means removably secured between the anchor pin and backing plate to obviate displacement of said anchor pin prior to the assembly of said brake assembly on a vehicle, said removably secured means being an integral part of said brake assembly.

Another object of the present invention is to provide a knuckle mounted brake assembly having means for obviating displacement of the anchor pin therefrom prior to assembly of said brake assembly on a vehicle, said means being connected with the wheel cylinder of said brake assembly to permit removal of said wheel cylinder when said brake assembly is mounted on said vehicle without disturbing said anchor pin.

Another object of the present invention is to provide a knuckle mounted brake of simplified construction in which the brake shoes are self-centering with respect to the drum and the braking torque is transmitted directly to the vehicle steering knuckle.

And still another object of the present invention is to provide a knuckle mounted brake assembly of integral construction which can be assembled, shipped and installed as a unit, thereby greatly facilitating the assembly line installation of such brake assemblies on new vehicles by vehicle manufacture and also greatly facilitating replacement and servicing of such brake assemblies.

These and other objects and advantages of the present invention will become apparent hereinafter.

Briefly, the invention embodies, in combination with a pair of offset friction device mounting means on a vehicle, a friction device including anchor means adapted for fixed engagement with one of said mounting means, friction members for anchoring engagement with said anchor means and displaceable into frictional engagement with a coacting member, and support means for said friction members and anchor means, said support means being in floating engagement with said anchor means and adapted for fixed engagement with the other of said mounting means. The invention also embodies means removably secured between said support means and anchor means to prevent radial displacement of said anchor means from the friction device.

Figure 2:
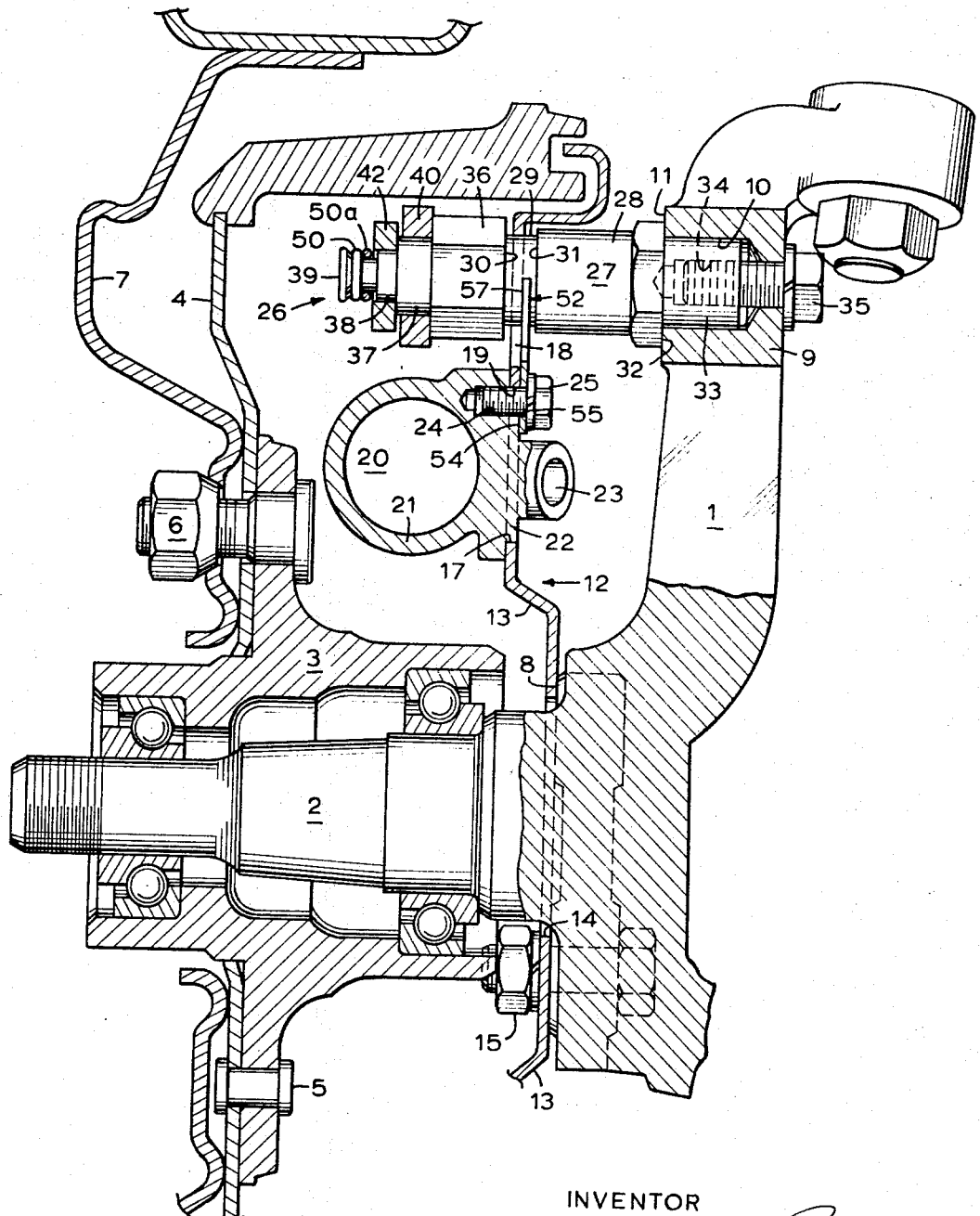
Figure 3:
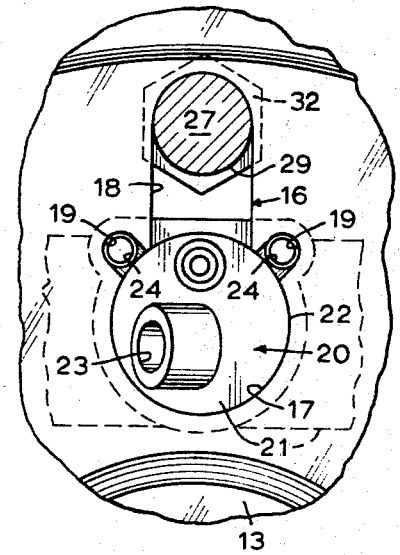
Figure 4:
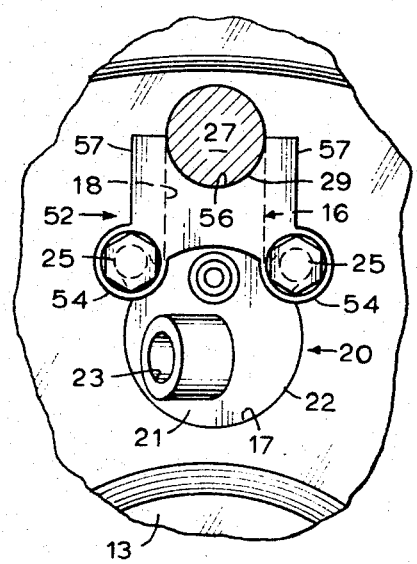
Figure 5:
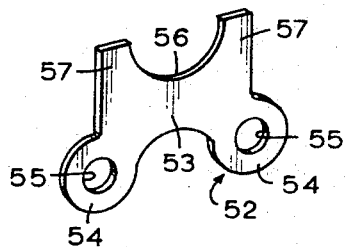
Figure 7:
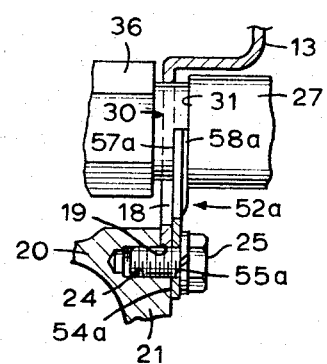
Figure 6:
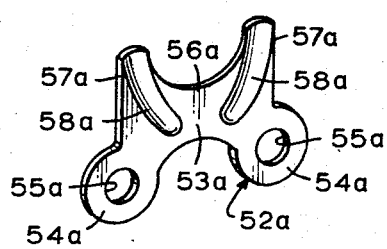

In the drawings which illustrate embodiments of the invention,

FIG. 1 is an elevational view of a knuckle mounted brake assembly embodying the present invention, the brake drum being shown in cross-section, FIG. 2 is a sectional view taken along line 2—2 of FIG. 1, FIG. 3 is an enlarged fragmentary view of the backing plate showing the keyhole-shaped opening therein prior to the assembly of the wheel cylinder thereon, FIG. 4 is an enlarged fragmentary view of the backing plate showing the wheel cylinder assembled therewith, FIG. 5 is an enlarged perspective view of a mounting member utilized in the present invention, FIG. 6 is an enlarged perspective view of an alternate mounting member for use in the present invention, and FIG. 7 is a fragmentary view taken from FIG. 2 showing the mounting member of FIG. 6 positioned in the brake assembly.

Referring now to the drawings in detail and in particular to FIGS. 1 and 2, a conventional steering knuckle 1 forming a vehicle structural member is shown carrying an axle spindle 2 on which a wheel hub 3 is rotatably journaled. A conventional brake drum assembly 4 is secured to the wheel hub 3 for rotation therewith by suitable means, such as a plurality of rivets 5, and a plurality of wheel lugs 6 are provided on said wheel hub to support a rotatable wheel assembly 7 in which is mounted a vehicle tire (not shown). The steering knuckle 1 is provided with a plurality of substantially coplanar friction device mounting surfaces 8 disposed about the spindle 2, and an enlarged embossment 9 having an axially stepped bore 10 therethrough is integrally formed on said steering knuckle, said embossment having another friction device mounting surface 11 disposed about the larger end of said stepped bore and radially spaced and axially offset from the spindle mounting surfaces 8.

A self-centering friction device, indicated generally at 12 and having substantially the same geometric configuration or design as that shown in U.S. Patent No. 3,115,954 issued to Glenn E. Borgard on December 31, 1963, is provided with a backing plate or support member 13 having a central opening 14 therein through which the spindle 2 extends, said backing plate being secured to the steering knuckle 1 in abutting engagement with the spindle mounting surfaces 8 by suitable means, such as nut and bolt assemblies 15. Referring now also to FIGS. 3 and 4, the backing plate 13 is also provided with a keyhole-shaped opening 16 having an enlarged circular lower portion 17 and a narrower radially extending slot portion 18, and bolt mounting apertures 19 are integrally formed with said keyhole-shaped opening extending radially from the periphery of said circular portion and spaced from each side of said slot portion. A conventional wheel cylinder 20 is provided with a housing 21 for engagement with the backing plate 13 about the circular portion 17 of the keyhole-shaped opening 16, and a mounting boss 22 is integrally provided on said housing extending through said circular portion 17 to provide access to the usual brake line receiving port 23 therein. The wheel cylinder housing 21 is also provided with threaded openings 24 therein aligned with the bolt receiving apertures 19, and studs 25 extend through said apertures 19 into threaded engagement with said openings 24 to fixedly position the mounting boss 22 within the circular portion 17 of the keyhole-shaped opening 16 and the wheel cylinder housing 21 in abutting engagement with the backing plate 13.

An anchor assembly 26, FIGS. 1 and 2, for the friction device 12 includes an anchor pin 27 having a substantially cylindrical body portion 28 with an annular groove 29 provided near the mid-portion thereof which is slidably received in the slot portion 18 of the keyhole opening 16 in the backing plate 13, and the opposed side walls 30, 31 of said groove are predeterminately spaced apart a distance greater than the thickness of said backing plate adjacent to said keyhole opening so that said backing plate "floats" in said groove, as described in detail hereinafter. A radially extending shoulder or mounting surface 32 is provided on the anchor pin 27 between the rightward end thereof and the groove 29 forming a mounting shank 33 which is slidably received in the larger stepped bore 10 of the knuckle embossment 9. A threaded shank or mounting bore 34 is provided in the shank portion 33 extending coaxially through the rightward end of the anchor pin 27, and a mounting stud 35 is threadedly interconnected between the knuckle 1 and the shank bore 34 to position the mounting shoulder 32 in abutting engagement with the knuckle mounting surface 11 and retain said shank portion against displacement from the bore 10 of the knuckle embossment 9. In this manner, the anchor pin 27 is rigidly secured to the knuckle 1. A hexagonally-shaped portion 36 is provided on the anchor pin 27 leftwardly of the groove 29 therein for positioning engagement by a tool (not shown) to retain said anchor pin against rotation when the mounting stud 35 is being threadedly engaged with the shank bore 34. The anchor pin 27 is also provided with a pair of stepped cylindrical portions 37, 38 between the leftward end thereof and the hexagonal portion 36, and an axially extending, beveled spring receiving post or extension 39 is integrally formed on the leftward end of said anchor pin. To complete the description of the anchor assembly 26, an anchor block member 40 having opposed planar and arcuate anchoring surfaces 41, 41a is rotatably received on the larger cylindrical portion 37 of the anchor pin 27, and a shoe guide or retainer member 42 is received on the smaller cylindrical portion 38 of said anchor pin in displacement preventing engagement with said anchor block.

A pair of brake shoes 43, 43a, having identical configurations, are slidably disposed on the backing plate 13 and retained thereon against lateral or axial displacement by the usual shoe hold down mechanisms 44, 44a, and the compressive force of a spring 45 biased between said brake shoes normally urges the adjacent articulated ends 46, 46a thereof into abutting engagement with an extendible adjustment mechanism 47. The adjacent anchoring ends 48, 48a of the brake shoes 43, 43a are provided with flat inclined anchoring surfaces 49, 49a normally urged into sliding self-centering anchoring engagement with the opposed anchoring surfaces 41, 41a of the anchor block 40 by the compressive forces of shoe return springs 50, 50a which are respectively connected between the anchor pin spring post 39 and said brake shoes, the ends of said shoe return springs on said anchor pin spring post being engaged with the shoe guide member 42 to prevent axial displacement of said shoe guide member and anchor block 40 from the anchor pin 27. The brake shoes 43, 43a are adapted for radial displacement on the backing plate 13 toward frictional engagement with the drum 4 by wheel cylinder push rods 51, 51a connected therewith and adapted to be actuated by the usual pistons (not shown) of the wheel cylinder 20.

Referring now to FIGS. 2, 4 and 5, a hanger or mounting member 52 is provided for radially or vertically positioning the anchor pin 27 with respect to the wheel cylinder 20 while the backing plate 13 floats in the anchor pin groove 29 to compensate for an axial and/or horizontal tolerance differential or buildup between the knuckle mounting surface 11 and the spindle mounting surface 8 and obviate distortion of said backing plate upon the assembly of the wheel brake 12 on the knuckle or support member 1. In other words, the hanger 52 retains the anchor pin 27 against vertical or radial displacement in the backing plate keyhole opening 16 prior to assembly of the brake assembly 12 on the vehicle support member 1 which facilitates pallatizing, handling and shipping of said brake assembly. The hanger 52 includes a main spacer body 53 having depending spaced ears 54 with openings 55 corresponding to the apertures 19 in the backing plate keyhole opening 16 and the threaded openings 24 in the wheel cylinder housing 20. The hanger body 53 has a semicircular cutout or upper margin 56 complementary to the anchor pin groove 29, and tines or fingers 57 are provided on each side of the cutout 56.

The anchor pin 27 is assembled with the backing plate 13 by being inserted into the circular lower portion 17 of the backing plate keyhole opening 16 with the anchor pin groove 29 in registry with the backing plate 13, and the anchor pin 27 is moved upwardly with the annular groove 29 being received into the slot portion 18 of said keyhole opening so that the groove side walls 30, 31 prevent axial displacement of said anchor pin from the backing plate 13. The hanger 52 is placed against the backing plate 13 and the fingers 57 are moved upwardly into the groove 29 between the backing plate 40 and the groove side wall 31 until the cutout portion 56 of the hanger 52 is positioned in abutting engagement with the anchor pin 27 in said groove and said groove is positioned in abutment with the upper end of the keyhole slot 18. With the hanger 52 and anchor pin 27 so positioned, the hanger ears 54 are positioned so that the openings 55 register with the keyhole apertures 19 in the backing plate 13. The wheel cylinder 20 is then positioned with the mounting boss 22 in the circular lower portion 17 of the keyhole opening 16 and the housing 21 thereof in abutment with the backing plate 13 to align the wheel cylinder threaded openings 24 with the keyhole apertures 19 and the hanger openings 55. The bolts 25 are then inserted through the hanger openings 55 and keyhole apertures 19 into threaded engagement with the openings 24 of the wheel cylinder 20.

In accordance with the invention, the predetermined clearance between the backing plate 13 at the keyhole slot 18 and the groove side walls 30, 31 of the anchor pin 27 provides a floating relation between said backing plate and anchor pin which obviates distortion of said backing plate upon assembly with the support member 1. In other words, when the anchor pin 27 is fixedly secured or mounted on the knuckle embossment 9 by the mounting stud 35 with the anchor pin shoulder 32 in abutting engagement with the knuckle mounting surface 11, the backing plate 13 can then be mounted on the spindle mounting surface 8 by the nut and bolt assemblies 15, and the aforementioned predetermined clearance between said backing plate and the groove side walls 30, 31 of said anchor pin permits slight relative axial movement or float therebetween to compensate for tolerance buildup and/or mis-alignment of the spindle and knuckle mounting surfaces 8, 11. In this manner, distortion of the backing plate 13 is prevented when said backing plate and anchor pin 27 are secured to the radially spaced and axially offset spindle and knuckle mounting surfaces 8, 11. Further, prior to such mounting of the backing plate 13 and anchor pin 27, the hanger 52 positions said anchor pin against radial displacement from the backing plate keyhole slot 18 while the groove side walls 30, 31 retain said anchor pin against axial displacement from said backing plate keyhole slot, thereby permitting handling, shipping and installation of the brake 12 independently of auxiliary holding or positioning means for said anchor pin.

In FIGS. 6 and 7, an alternate construction is shown wherein a hanger 52a is provided with the same integral parts and functions in combination with the component parts of the friction device 12 in the same manner as the previously described hanger 52 with the following exceptions. The fingers 57a of the hanger 52a are formed as resilient spring members having elongated arcuate depressions or spring-like grooves 58a extending into the body section 53a forming resilient portions. The hanger 52a is assembled on the backing plate 13 and within the anchor pin groove 29 in the same manner as the previously described hanger 52 except that the resilient portion 58a of the fingers 57a are engaged with the side wall 31 of the anchor pin groove 29. When the hanger 52a is assembled in this manner, the resilient portions 58a thereof deform and, in effect, wedge said hanger between the backing plate 13 and the groove side wall 31; therefore, if the wheel cylinder 20 is disassembled from said backing plate for replacement or service purposes, the hanger 52a is resiliently retained in its assembled position with the openings 55a in the hanger ears 54a in alignment with the mounting apertures 19 of the keyhole opening 16 in said backing plate.

It will be understood that all braking forces are transmitted from the brake shoes 43, 43a through the anchoring assembly 26 directly to the steering knuckle 1 and that the backing plate 13 merely functions as a dust shield, as a stabilizer for restraining brake shoe displacement from the brake 12 during shipment and installation, and as a cooperable part in securing and spacing the wheel cylinder 20 and anchor pin 27 in assembled relationship. The brake assembly 12 not only facilitates manufacture and installation but also permits the wheel cylinder 20 to be disassembled for service or replacement without requiring the disassembly of the anchor pin 26 from the knuckle 1, and it is possible to disassemble said wheel cylinder 20 without disturbing the position of any of the component parts of said friction device.

It will also be understood that the sliding engagement of the brake shoes surfaces 49, 49a with the anchoring surfaces 41, 41a of the rotatable anchor block 40 provides fully floating or self-centering brake shoe conditions permitting the brake shoes 43, 43a to adjust themselves concentrically with the drum 4.

From the foregoing, it is now apparent that a novel knuckle mounted friction device meeting the objects and advantages set out hereinbefore is provided and that changes or modifications as to the precise configurations, shapes and details of the construction set forth in the disclosure by way of illustration may be made by those skilled in the art without departing from the spirit of the invention is defined by the claims which follow.

The embodiments of the invention in which an exclusive property or privilege is claimed are defined as follows:

1. In combination with a pair of friction device mounting means on a vehicle structural member, support means for a friction device comprising a pair of supporting members for respective assembly into fixed engagement with said mounting means, said supporting members being immovable with respect to each other when fixedly engaged with said mounting means, one of said supporting members extending through the other of said supporting members, and said one supporting member including means spaced from said other supporting member for displacement preventing engagement therewith and providing a predetermined amount of relative movement between said supporting members during their respective assembly into fixed engagement with said mounting means.

2. In combination with a vehicle structural member including an axle spindle, a brake drum rotatably supported on said spindle, a mounting pad on said structural member adjacent to said spindle, and a mounting embossment on said structural member and spaced from said spindle, a friction device comprising support means for assembly into fixed engagement with said mounting pad, friction means supported on said support means for displacement into frictional engagement with said drum, and anchor means for said friction means extending through said support means for assembly into fixed engagement with said mounting embossment, said support means and anchoring means respectively including spaced means engageable to prevent relative displacement of said anchor means and said support means and to provide a predetermined amount of relative movement between said support means and anchoring means during their respective assembly into fixed engagement with said mounting pad and mounting embossment.

3. In combination with a pair of friction device mounting means on a vehicle structural member, support means for a friction device comprising a support plate for assembly into fixed engagement with one of said mounting means, aperture means in said support plate, and friction device anchor means extending through said aperture means for assembly into fixed engagement with the other of said mounting means including means normally spaced from the opposed sides of said support plate adjacent to said aperture means for lost motion engagement therewith to prevent displacement of said anchor means through said aperture means prior to the assembly of said anchor means and support plate into fixed engagement with said mounting means and to provide a predetermined amount of relative movement between said anchor means and support plate during their respective assembly into fixed engagement with said mounting means.

4. In combination with a pair of friction device mounting means on a vehicle structural member, support means for a friction device comprising a relatively thin annular support plate for assembly into fixed engagement with one of said mounting means, aperture means in said support plate adjacent to the peripheral portion thereof, friction device anchor means substantially parallel to said spindle and extending axially through said aperture means for assembly into fixed engagement with the other of said mounting means, said support plate having opposed abutment portions adjacent to said aperture means, and spaced abutment means on said anchor means for respective engagement with said opposed abutment portions to obviate relative displacement of said support plate and anchor means and providing a predetermined amount of relative movement between said support plate and anchor means during their respective assembly into fixed engagement with said mounting means to obviate distortion of said relatively thin support plate.

5. In combination with a pair of friction device mounting means on a vehicle structural member, support means for a friction device comprising a support member having a mounting side for assembly into fixed engagement with one of said mounting means, a friction member support side on said support member opposite said mounting side, friction member anchor means extending through said support member between said support and mounting sides thereof and having a portion on said mounting side for assembly into fixed engagement with the other of said mounting means, said support member and anchor means being relatively immovable when fixedly engaged with said mounting means, and means on said anchor means in spaced relation with the support and mounting sides of said support member, respectively, said last named means being engageable with the support and mounting sides of said support member to prevent displacement of said anchor means from said support member and to provide limited relative movement between said support member and anchor means during the assembly thereof into fixed engagement with said mounting means.

6. A friction device adapted for mounting on a pair of friction device mounting means of a vehicle structural member comprising support means having a mounting side for assembly into fixed engagement with one of said mounting means, a friction means support side on said support means opposite the mounting side thereof, anchor means extending through said support means between the support and mounting sides thereof, said anchor means having a friction means anchoring portion on the support side of said support means and a mounting portion on the mounting side of said support means for assembly into fixed engagement with the other of said mounting means, friction means movably supported on the support side of said support means for anchoring engagement with the anchoring portion of said anchoring means, motor means on said support means and connected with said friction means to effect displacement movement thereof into frictional engagement with a coacting member, and a pair of abutment means on said anchor means in spaced relation with the support and mounting sides of said support means, respectively, said abutment means being predeterminately spaced apart to provide limited relative movement between said support means and anchor means during the respective assembly thereof into fixed engagement with said one and other mounting means and being respectively engageable with the support and mounting sides of said support means to prevent displacement of said anchor means from said support means.

7. In combination with a pair of friction device mounting means of a vehicle structural member, a friction device comprising support means for assembly into fixed engagement with one of said mounting means, friction means movably supported on said support means for displacement into frictional engagement with a coacting member, anchor means extending through said support means and having spaced anchoring and mounting portions thereon adjacent to the opposed sides of said support means for anchoring engagement with said friction means and for assembly into fixed engagement with the other of said mounting means, respectively, and groove means in said anchor means between said anchoring and mounting portions including opposed abutment means for displacement preventing engagement with the opposed sides of said support means and providing a predetermined amount of relative movement between said anchor means and support means during their respective assembly into fixed engagement with said mounting means to obviate distortion of the support means.

8. In combination with a pair of friction device mounting means on a vehicle structural member, a friction device comprising a support member for assembly into fixed engagement with one of said mounting means, friction means movably supported on said support member for displacement into frictional engagement with a coacting member, motor means on said support member for displacing said friction means, aperture means extending through said support member, opposed abutment surfaces on said support member and adjacent to the opposed ends of said aperture means, and an anchor member for assembly into fixed engagement with the other of said mounting means and extending through said aperture means into anchoring engagement with said friction means, said support plate and anchor member being relatively immovable when fixedly engaged with said mounting means, and said anchor member including spaced means for lost motion engagement with said abutment surfaces to prevent displacement of said anchor member from said support member through said aperture means and to provide a predetermined amount of relative movement between said anchor member and support member during the respective assembly thereof into fixed engagement with said mounting means in order to obviate distortion of said support member.

9. A vehicle brake comprising, in combination, a support member having a spindle thereon, a pair of embossments on said support member respectively having planar surfaces substantially normal to the axis of said spindle for mounting said brake, a brake drum rotatably supported on said spindle in concentric relation therewith, a backing plate substantially concentric with said spindle and having a portion for assembly into fixed engagement with one of said embossments in abutment with the planar surface thereof, a pair of brake shoes mounted on said backing plate for frictional engagement with said drum, motor means on said backing plate for actuating said brake shoes, an anchor pin for said brake shoes, aperture means extending through said backing plate substantially parallel to the axis of said spindle for alignment with the other of said embossments, said anchor pin extending through said aperture means and having a portion for assembly into fixed engagement with said other embossment in abutment with the planar surface thereof, said support member and anchor pin being relatively immovable when assembled into fixed engagement with their respective embossments, and means on said anchor pin normally axially spaced from said backing plate for engagement therewith to prevent displacement of said anchor pin through said aperture means and to provide a predetermined amount of relative movement between said backing plate and anchor pin during their respective assembly into fixed engagement with said embossments.

10. In a vehicle drum brake comprising, in combination, a steering and wheel support member having an axle spindle extending therefrom, a backing plate mounting embossment on said support member adjacent to said spindle and having a planar surface substantially normal to the axis of said spindle, an anchor pin mounting embossment on said support member including an anchor pin receiving opening therein radially spaced from and substantially parallel with the axis of said spindle, and another planar surface on said anchor pin mounting embossment disposed about said opening and substantially parallel with said first named planar surface, a brake drum rotatably mounted on said spindle in concentric relation therewith, a backing plate concentric with said spindle for assembly into fixed engagement with said backing plate mounting embossment in abutment with said first named planar surface, a pair of displaceable brake shoes supported on said backing plate and having adjacent anchoring and articulated ends mounted in opposed relation on said backing plate, force transmitting means connected between the adjacent articulated ends of said brake shoes, a wheel cylinder mounted on said backing plate and connected with said brake shoes to effect displacement thereof into frictional engagement with said brake drum, aperture means extending through said backing plate and substantially coaxial with said opening in said anchor pin mounting embossment, an anchor pin including a mounting portion received in said opening for assembly into fixed engagement with said anchor pin embossment in abutment with said other planar surface, an anchoring portion on said anchor pin for anchoring engagement with the adjacent anchoring ends of said brake shoes, resilient means biased between said anchor pin and brake shoes normally urging the adjacent anchoring ends thereof toward anchoring engagement with said anchoring portion, an intermediate portion on said anchor pin between said mounting and anchoring portions thereof and extending coaxially through said aperture means, and a pair of abutment means on said anchor pin between said intermediate portion and said mounting and anchoring portions, respectively, and normally spaced from the opposed sides of said backing plate for lost motion engagement therewith about said aperture means to prevent displacement of said anchor pin from said backing plate through said aperture means prior to the assembly of said anchor pin and backing plate into fixed engagement with said anchor pin and backing plate mounting embossments, and said spaced abutment means also providing a predetermined amount of relative movement between said anchor pin and backing plate during their respective assembly into fixed engagement with said anchor pin and backing plate mounting embossments to obviate backing plate distortion.

11. In a friction device comprising a pair of support members for mounting said friction device on a vehicle, aperture means provided through one of said support members including a slot portion and an enlarged portion connected therewith, the other of said support members being received through said aperture means and including means received in registry with said slot portion to prevent displacement of said other support member, from said one support member through said slot portion, and other means for engagement with said other support member to obviate displacement thereof from said slot portion into said enlarged portion.

12. In the friction device according to claim 11, wherein said included means comprises groove means in said other support member having a base wall connected between opposed sidewalls, said base wall being received in said slot portion and said sidewalls being respectively spaced for displacement preventing engagement with the opposed sides of said one support member adjacent to said slot portion.

13. In the friction device according to claim 12, wherein said other means includes a retaining member connected with said one support member and having an abutment portion thereon for engagement with said other member to obviate displacement thereof from said slot portion into said enlarged portion.

14. In the friction device according to claim 12, wherein said other means includes a retaining member connected with said one support member and having an abutment portion thereon for engagement with said base wall between one of said opposed sidewalls and one of the opposed sides of said one support member.

15. In the friction device according to claim 14, wherein said abutment portion comprises opposed finger means on said retaining member and extending into said groove means between said one opposed sidewall and said one opposed side of said one support member, and a surface on said abutment portion between said opposed finger means for engagement with said base wall.

16. In the friction device according to claim 15, wherein at least one of said opposed finger means includes a resilient portion engaged between said one opposed sidewall and said one opposed side of said one support member.

17. In the friction device according to claim 11, wherein said other means includes a retaining member connected with said one support member and having an abutment portion thereon for engagement with said other member to obviate displacement thereof from said slot portion into said enlarged portion.

18. In a friction device comprising a pair of support members for mounting engagement with a structural member of a vehicle, respectively, aperture means axially provided through one of said support members including an enlarged portion and a slot portion interconnected therewith and extending substantially radially therefrom, groove means in the other of said support members, said other support member being received through said enlarged portion to register said groove means in said slot portion, said groove means having opposed sidewalls spaced from the opposed sides of said one support member adjacent to said slot portion and respectively engageable therewith to prevent displacement of said other support member from said one support member axially of said slot portion, and other means for engagement between said support members to substantially obviate radial displacement of said other support member from said slot portion into said enlarged portion.

19. In the friction device according to claim 18, wherein said other means includes resilient means engaged with one of said groove sidewalls.

20. In combination with a vehicle structural member having a pair of friction device mounting means thereon, a friction device comprising support means for assembly into fixed engagement with one of said mounting means, friction means movably supported on said support means for displacement into frictional engagement with a coacting member, aperture means axially provided through said support means including an enlarged portion having a slot portion extending substantially radially therefrom, anchor means having an anchoring portion for said friction means and a mounting portion for assembly into fixed engagement with the other of said mounting means, said anchor means being sized to be received through said elarged portion and including groove means between said anchoring and mounting portions thereof sized to be received into said slot portion, said groove means serving to prevent displacement of said anchor means axially of said slot portion prior to the assembly of said anchor means and support means into fixed engagement with said one and other mounting means and to provide a predetermined amount of relative movement between said anchor means and support means during their respective assembly into fixed engagement with said mounting means, and other means engaged between said anchor means and support means to substantially obviate radial displacement of said anchor means from said slot means into said enlarged portion prior to the assembly of said anchor means and support means into fixed engagement with said one and other mounting means.

21. The combination according to claim 20 wherein said other means includes resilient means removably secured between said support means and a wall of said groove means.

22. The combination according to claim 20 wherein said other means includes retainer means removably connected with said support means and having an abutment portion thereon in abutting engagement with said anchor means.

23. The combination according to claim 20 wherein said groove means includes opposed annular sidewalls predeterminately spaced for lost motion engagement with the opposed sides of said support means adjacent to said aperture means slot portion, respectively, and an annular base wall interconnecting said sidewalls, said other means including retainer means having one end thereof connected with said support means and having an abutment portion in the other end thereof substantially complementary with a portion of said base wall and in abutting engagement therewith, and finger means defined on said retainer means on opposite sides of said abutment portion and extending into said groove means between said support means and one of said sidewalls.

24. The combination according to claim 23 wherein at least one of said finger means includes a resilient portion engaged between said one sidewall and said support means.

References Cited by the Examiner

UNITED STATES PATENTS 2,885,035  5/1959  Rubly _____ 188—206
2,902,118  9/1959  Parker _____ 188—78

DUANE A. REGER, *Primary Examiner.*